(12) United States Patent
Miura et al.

(10) Patent No.: US 7,413,699 B2
(45) Date of Patent: Aug. 19, 2008

(54) METHOD OF MAKING CERAMIC ELECTRONIC ELEMENT

(75) Inventors: Shuichi Miura, Yuri-gun (JP); Tetsuji Maruno, Chuo-ku (JP); Kazuhiko Oda, Chuo-ku (JP); Akira Sasaki, Chuo-ku (JP); Kouji Tanaka, Chuo-ku (JP)

(73) Assignee: TDK Corporation, Tokyo (JP)

( * ) Notice: Subject to any disclaimer, the term of this patent is extended or adjusted under 35 U.S.C. 154(b) by 617 days.

(21) Appl. No.: 10/942,959

(22) Filed: Sep. 17, 2004

(65) Prior Publication Data

US 2005/0067744 A1    Mar. 31, 2005

(30) Foreign Application Priority Data

Sep. 25, 2003    (JP)    ............... 2003-333713

(51) Int. Cl.
C04B 33/32    (2006.01)
(52) U.S. Cl. ...................... 264/619; 264/620
(58) Field of Classification Search ................ 264/618, 264/619, 620; 156/89.11
See application file for complete search history.

(56) References Cited

U.S. PATENT DOCUMENTS 4,353,957 A * 10/1982 Rutt et al. .................... 428/110
5,004,640 A * 4/1991 Nakatani et al. ......... 428/195.1
5,997,774 A * 12/1999 Shimizu et al. ............. 252/514

FOREIGN PATENT DOCUMENTS

| JP | A 06-215980 | 8/1994 |
| JP | A 7-176448 | 7/1995 |
| JP | 07-201222 | * 8/1995 |
| JP | A 7-242845 | 9/1995 |
| JP | A 2001-110233 | 4/2001 |
| JP | B2 3346023 | 9/2002 |

* cited by examiner

*Primary Examiner*—Carlos Lopez
(74) *Attorney, Agent, or Firm*—Oliff & Berridge, PLC

(57) ABSTRACT

A ceramic electronic element having improved the continuity of inner electrode layers while suppressing the decrease in adhesion between its dielectric layers and inner electrode layers and the deterioration in functions of the inner electrode layers, and a method of making the same are provided. In the method of making a ceramic capacitor (10) in accordance with the present invention, an electrode paste (22) is applied to a surface (20*a*) of a green sheet (20) and fired, so as to form a dielectric layer (12) laminated with an electrode layer (14). Since the electrode paste (22) is doped with a $BaTiO_3$ powder, the adhesion between the dielectric layer (22) and inner electrode layer (14) after firing is significantly restrained from lowering, and the sintering start temperature of the electrode paste (22) is close to that of the green sheet (20). Since the electrode paste (22) is doped with a metal resinate, functions of the inner electrode layer (14) are significantly restrained from deteriorating when the insulating $BaTiO_3$ powder is added to the electrode paste (22), and the sintering start temperature of the electrode paste (22) approaches that of the green sheet (20).

6 Claims, 3 Drawing Sheets

METHOD OF MAKING CERAMIC ELECTRONIC ELEMENT

DESCRIPTION

Ceramic electronic element and method of making same

TECHNICAL FIELD

The present invention relates to a ceramic electronic element and a method of making the same; and, in particular, to a ceramic electronic element in which dielectric layers and electrode layers are alternately laminated, and a method of making the same.

BACKGROUND ART

Conventionally known in general as methods of making a ceramic electronic element such as laminated ceramic capacitor are those of sheet process and of printing process. Each of these methods forms a laminate in which a plurality of layers made of a ceramic dielectric powder constituting dielectric layers and a plurality of layers made of a metal paste (electrode paste) constituting inner electrode layers are alternately stacked, fires the laminate, and then providing the laminate with outer electrodes, thereby making a ceramic electronic element.

Employed for forming the dielectric layers is a ceramic article made by mixing the ceramic dielectric powder and an organic binder so as to form a slurry, shaping the slurry into a sheet by a method such as doctor blade method, and drying the sheet as appropriate. The electrode paste used for forming the inner electrodes, on the other hand, is formed by dispersing a metal powder such as nickel powder into an organic binder and an organic solvent so as to yield a paste.

A laminated ceramic capacitor is usually obtained by screen-printing the above-mentioned electrode paste onto a surface of the sheet-like ceramic article, drying the organic solvent contained in the electrode paste, then stacking a plurality of such articles, press forming the articles so as to yield a laminate, forming the laminate into a chip, and firing the chip.

Meanwhile, the electrode paste has a sintering start temperature lower than that of the ceramic article and dielectric paste. Therefore, when the laminate is heated for firing, the electrode paste starts sintering earlier than the ceramic article does. As a result, the electrode paste is fired in excess, and thus aggregates in a state where metal components of the electrode paste are unevenly distributed. Therefore, many discontinuous parts occur in the inner electrode layers in the fired laminate, whereby the continuity of layers may deteriorate remarkably. This may reduce the substantial opposing area between the inner electrode layers, thereby decreasing the electrostatic capacity of the laminated ceramic capacitor produced from the fired laminate.

Therefore, it has generally been practiced that a powder material (common material) of the same species as that of the ceramic powder contained in the dielectric paste is added to the electrode paste, so as to allow the firing start temperature of the electrode paste approach that of the ceramic article, and the shrinkage ratio of the electrode paste at the time of firing to approach that of the ceramic article. Since the common material is an insulating material, however, the function of the inner electrode layer as an electrode deteriorates more as a greater amount of the common material is added to the electrode paste. Therefore, from the viewpoint of electrode characteristics of the inner electrode layer, it is preferred that the amount of addition of the common material be as small as possible.

A technique in which a metal resinate is added to the electrode paste in order to suppress the above-mentioned decrease in electrostatic capacity is disclosed in Japanese Patent Application Laid-Open No. HEI 7-176448, for example. In the technique disclosed in the above-mentioned publication, fine metal particles of the metal resinate are generated between the metal components of the electrode paste at the time of firing the laminate, whereby the electrode function of the inner electrode layer hardly deteriorates even when the metal resinate is added to the electrode paste. Also, adding the metal resinate to the electrode paste can raise the sintering start temperature of the electrode paste. Therefore, the use of the electrode paste to which the metal resinate is added as disclosed in the above-mentioned publication can improve the continuity of the inner electrode layers while restraining the function of the inner electrodes as an electrode from deteriorating.

However, the following problem exists in the above-mentioned electrode paste employed in a ceramic electronic element. Namely, the metal resinate greatly shrinks at the time of firing, since the volume ratio of metal components is low therein. The shrinkage ratio of the metal resinate is much greater than that of the ceramic dielectric powder. Therefore, when only such a metal resinate is added to the electrode paste by a large amount in order for the sintering start temperature of the electrode paste to approach that of the ceramic article, the above-mentioned difference in shrinkage ratio lowers the adhesion between the dielectric layers and inner electrode layers, thereby deteriorating characteristics of the electronic element.

In view of the problem mentioned above, it is an object of the present invention to provide a ceramic electronic element having improved the continuity of inner electrode layers while suppressing the decrease in adhesion between its dielectric layers and inner electrode layers and the deterioration in functions of the inner electrode layers, and a method of making the same.

DISCLOSURE OF THE INVENTION

The present invention provides a method of making a ceramic electronic element, the method comprising the steps of applying an electrode paste containing a metal powder and additionally including a ceramic dielectric powder and a metal resinate to a surface of a ceramic article having a sheet form made of the ceramic dielectric powder; stacking a plurality of the ceramic articles each coated with the electrode paste so as to form a laminate comprising the ceramic articles and electrode pastes stacked alternately with each other; and firing the laminate.

In the method of making a ceramic electronic element, an electrode paste is applied to the surface of a ceramic article and fired, whereby a dielectric layer laminated with an electrode layer is formed. The electrode paste contains a metal powder, while a ceramic dielectric powder and a metal resinate are added thereto. Adding the dielectric powder to the electrode paste significantly restrains the adhesion between the dielectric layers and inner electrode layers from decreasing after firing when a large amount of the metal resinate is added to the electrode paste. Also, the sintering start temperature of the electrode paste approaches that of the ceramic article, thereby significantly improving the continuity of the inner electrode layers after firing. Since the metal resinate generating fine metal particles at the time of firing is added to the electrode paste, the inner electrode layers are significantly restrained from deteriorating their functions when an insulating dielectric powder is added to the electrode paste. Also, the sintering start temperature of the electrode paste approaches that of the ceramic article, thereby significantly improving the continuity of the inner electrode layers after firing. Therefore, firing a laminate in which a plurality of ceramic articles each coated with the electrode paste are stacked can make a ceramic electronic element having improved the continuity of inner electrode layers while suppressing the decrease in adhesion between its dielectric layers and inner electrode layers and the deterioration in functions of the inner electrode layers.

Preferably, the metal resinate comprises a metal component of the same species as that of a metal component acting as a main ingredient of the ceramic dielectric. In this case, at the time when the electrode paste doped with the metal resinate is sintered, a fine metal particle of the same species as that of the metal component of the ceramic dielectric powder is generated.

Preferably, the electrode paste contains a plurality of species of mixed metal resinates comprising respective metal components corresponding to a plurality of metal components of the ceramic dielectric, whereas the plurality of species of metal resinates have such a mixing ratio that the metal components contained in the resinates have respective molar ratios substantially identical to those of the metal components of the ceramic dielectric. In this case, a powder identical to the ceramic dielectric powder is generated when the electrode paste doped with the metal resinates is sintered.

Preferably, the ceramic dielectric is mainly composed of $BaTiO_3$, whereas the plurality of species of metal resinates are constituted by Ti resinate and Ba resinate mixed such that Ti and Ba have substantially the same mole number. In this case, the method of making a ceramic electronic element in accordance with the present invention is employed in $BaTiO_3$ used in general as a dielectric.

Preferably, the metal resinate contains at least one of Ba resinate, Ca resinate, Sr resinate, Ti resinate, Zr resinate, and Hf resinate.

Preferably, letting $\alpha$ be the wt % concentration of the metal component in the metal resinate with respect to the metal powder contained in the electrode paste, and $\beta$ be the wt % concentration of the ceramic dielectric powder with respect to the metal powder contained in the electrode paste, $\alpha$ and $\beta$ satisfy the following expressions (1) and (2):

$$0 < \alpha \leq 5 \quad (1)$$

$$3 \leq \alpha \leq 15 \quad (2)$$

Preferably, $\alpha$ and $\beta$ satisfy the following expressions (3) and (4):

$$0.5 < \alpha \leq 2 \quad (3)$$

$$5 \leq \alpha \leq 15 \quad (4)$$

The present invention provides a ceramic electronic element made by applying an electrode paste containing a metal powder and additionally including a ceramic dielectric powder and a metal resinate to a surface of a ceramic article having a sheet form made of the ceramic dielectric powder; stacking a plurality of the ceramic articles each coated with the electrode paste so as to form a laminate comprising the ceramic articles and electrode pastes stacked alternately with each other; and firing the laminate.

In this ceramic electronic element, an electrode paste is applied to the surface of a ceramic article and fired, whereby a dielectric layer laminated with an electrode layer is formed. The electrode paste contains a metal powder, while a ceramic dielectric powder and a metal resinate are added thereto. Adding the dielectric powder to the electrode paste significantly restrains the adhesion between the dielectric layers and inner electrode layers from decreasing after firing when a large amount of the metal resinate is added to the electrode paste. Also, the sintering start temperature of the electrode paste approaches that of the ceramic article, thereby significantly improving the continuity of the inner electrode layers after firing. Since the metal resinate generating fine metal particles at the time of firing is added to the electrode paste, the inner electrode layers are significantly restrained from deteriorating their functions when an insulating dielectric powder is added to the electrode paste. Also, the sintering start temperature of the electrode paste approaches that of the ceramic article, thereby significantly improving the continuity of the inner electrode layers after firing. Therefore, in the ceramic electronic element made by firing a laminate in which a plurality of ceramic articles each coated with the electrode paste are stacked, the continuity of inner electrode layers is improved while the decrease in adhesion between the dielectric layers and inner electrode layers and the deterioration in functions of the inner electrode layers are suppressed.

BEST MODES FOR CARRYING OUT THE INVENTION

In the following, modes considered to be the best when embodying the ceramic electronic element in accordance with the present invention and the method of making the same will be explained in detail with reference to the accompanying drawings. Constituents identical or equivalent to each other will be referred to with numerals identical to each other, while omitting their overlapping explanations if any.

Figure 1:
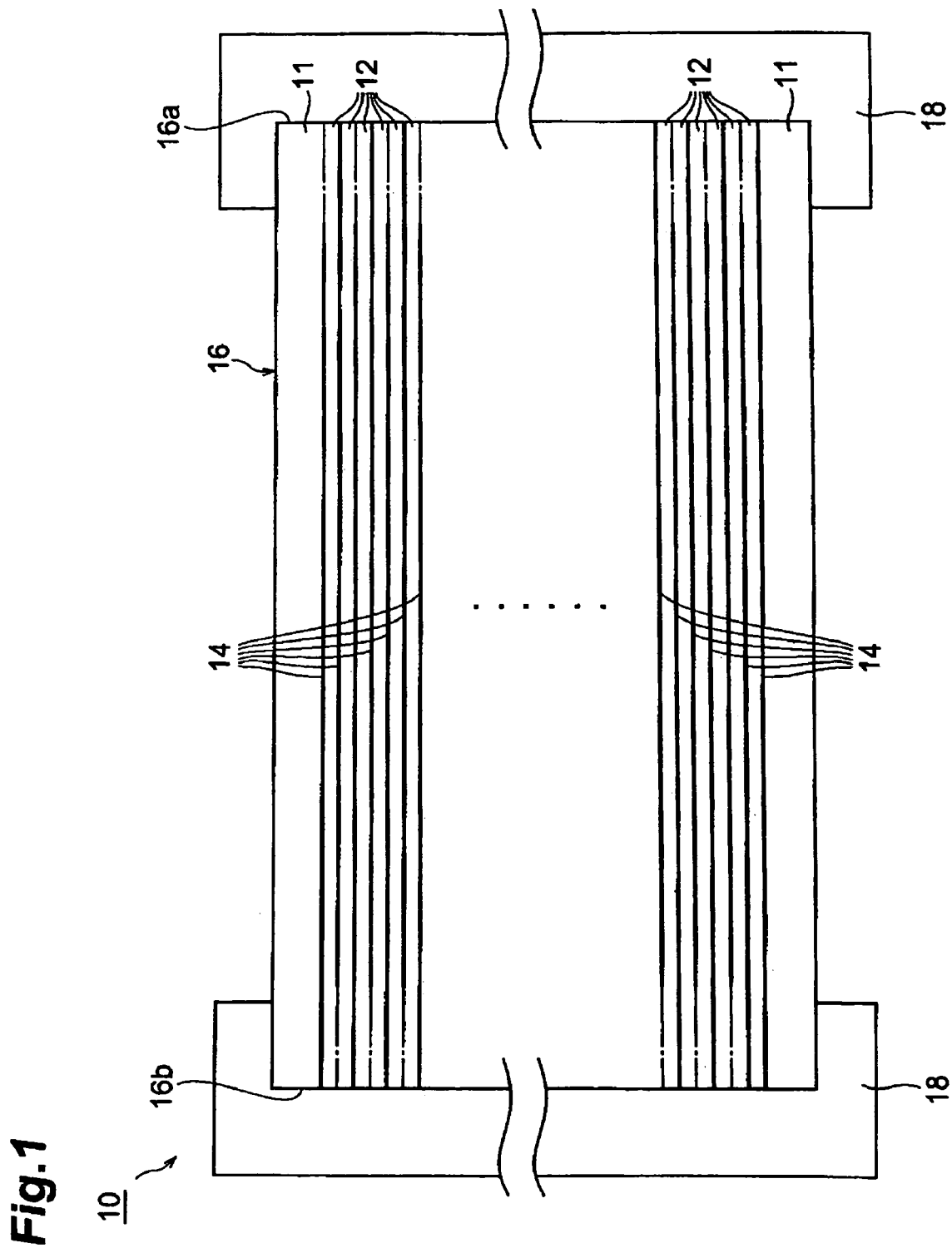
FIG. 1 is a schematic sectional view of the ceramic capacitor in accordance with an embodiment of the present invention.

FIG. 1 is a schematic sectional view showing the ceramic capacitor in accordance with an embodiment of the present invention. As shown in FIG. 1, a ceramic capacitor 10, which is a kind of ceramic electronic element, comprises a hexagonal capacitor matrix 16 having two surface layers 11 which are the outermost layers, about 300 dielectric layers 12 held between the surface layers 11, and inner electrode layers 14 interleaved with the dielectric layers 12. Namely, the capacitor matrix 16 has a laminate structure constituted by about 600 layers, in which the dielectric layers 12 and inner electrode layers 14 are stacked alternately with each other. Among the end faces of the capacitor matrix 16, a pair of end faces 16a, 16b extending along the thickness of the capacitor matrix 16 and opposing each other are completely covered with a pair of outer electrodes 18, 18, respectively.

Each pair of inner electrode layers 14 arranged on the upper and lower sides are electrically insulated from each other by the dielectric layer 12 and are connected to respective one outer electrodes 18 different from each other. Therefore, when a predetermined voltage is applied between a pair of outer electrodes 18, 18, electric charges are stored between each pair of vertically opposing inner electrode layers 14. The electrostatic capacity of the ceramic capacitor 10 is in proportion to the opposing area of the vertically opposing inner electrodes 14.

Each of the surface layers 11 and dielectric layers 16 is mainly composed of $BaTiO_3$. Each surface layer 11 has a thickness of about 50 μm, whereas each dielectric layer 16 has a thickness of about 1 to 4 μm. The surface layers 11 and dielectric layers 16 are formed by firing green sheets (ceramic articles) which will be explained later. Each inner electrode layer 14 is a metal layer mainly composed of Ni and has a thickness of about 1 μm. Each outer electrode 18 is constituted by Cu, Ni, and Sn.

Figure 2:
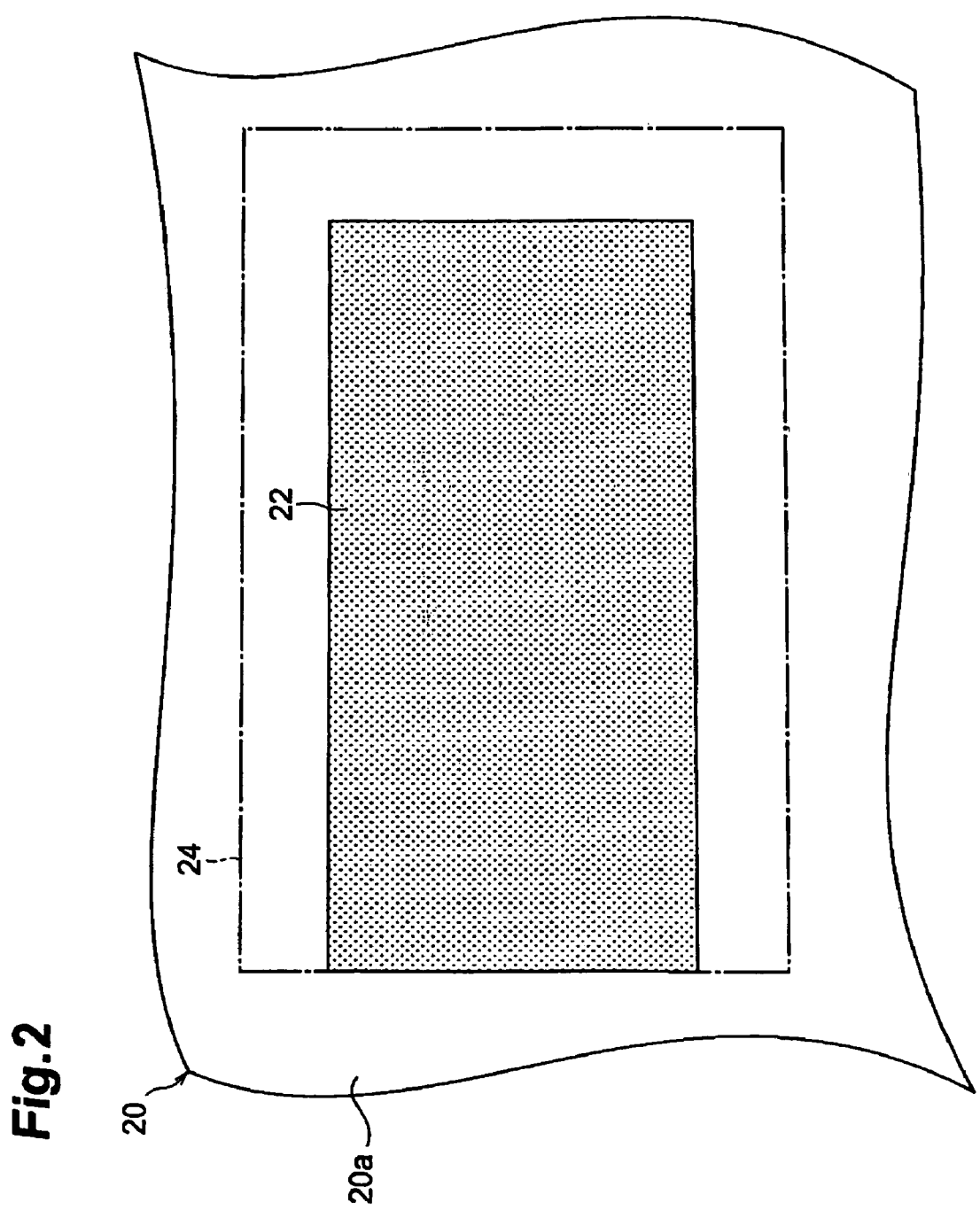
FIG. 2 is a partly enlarged view showing a printed pattern of a green sheet.
Figure 3:
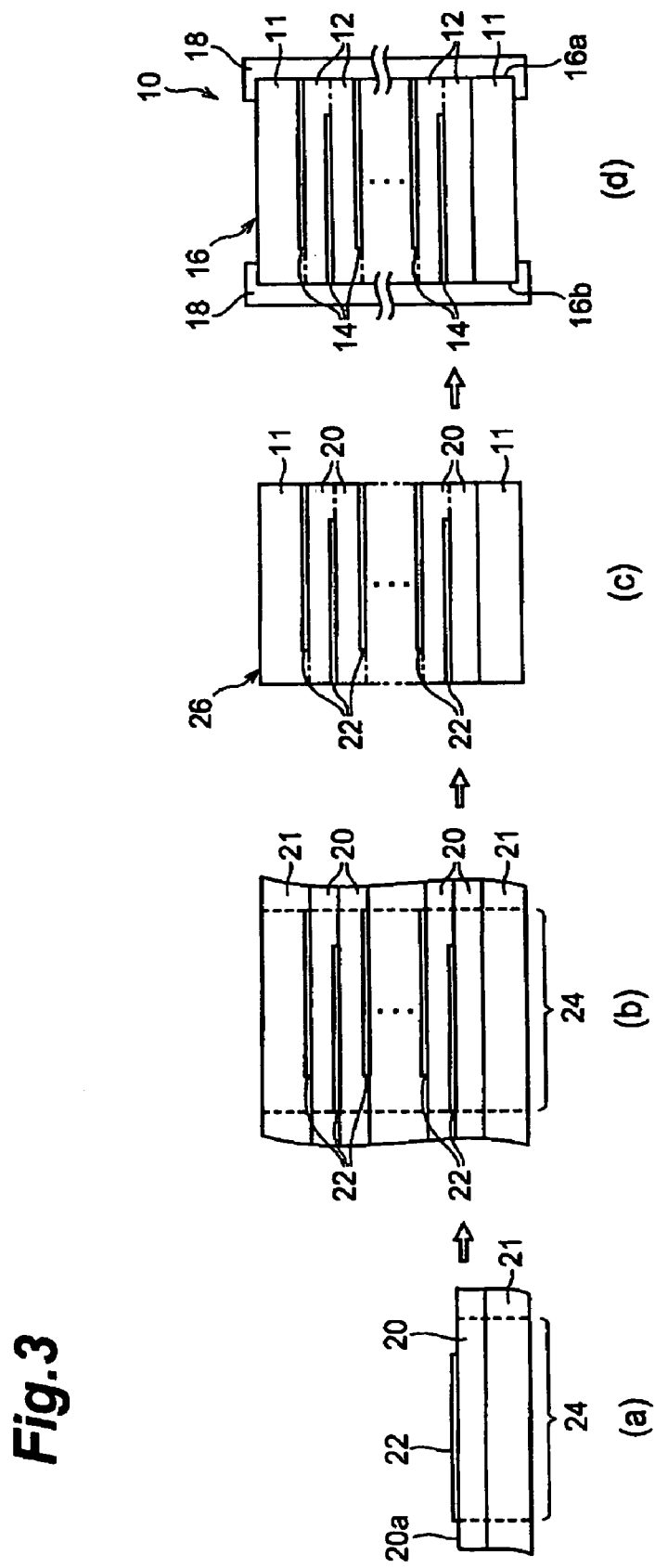
FIG. 3 is a view showing a procedure of making the ceramic capacitor.

A method of making the above-mentioned ceramic capacitor 10 will now be explained with reference to FIGS. 2 and 3. FIG. 2 is a partly enlarged view showing a printed pattern of a green sheet, whereas FIG. 3 is a view showing a procedure of making the ceramic capacitor.

For making the ceramic capacitor 10, a dielectric green sheet 20 of $BaTiO_3$ type is prepared as shown in FIG. 2. This green sheet is a sheet formed by doctor blade method from a dielectric paste in which a $BaTiO_3$ powder (ceramic dielectric powder) and an organic binder are mixed so as to yield a slurry. On the other hand, two green sheets 21, each having a thickness greater than that of the green sheet 20, for forming the surface layers 11 are prepared.

Subsequently, an electrode paste 22 having a predetermined pattern is applied to a surface 20a of the green sheet 20 by screen printing and then dried. Namely, the electrode paste 22 is applied to the area of a rectangular region 24 corresponding to one capacitor except for edge areas of three sides (see FIG. 2). The electrode paste 22 is one in which a nickel powder (metal powder) is dispersed into an organic binder and an organic solvent so as to form a paste. For the organic binder, known binders can be used. For example, binders such as cellulose type resins, epoxy resins, aryl resins, acrylic resins, phenol/formaldehyde resins, unsaturated polyester resins, polycarbonate resins, polyamide resins, polyimide resins, alkyd resins, and rosin esters can be used. For the organic solvent, known solvents can be used. For example, solvents such as butyl carbitol, butyl carbitol acetate, turpentine oil, α-terpineol, ethyl cellosolve, and butyl phthalate can be used.

Also, a $BaTiO_3$ powder as a common material, and a metal resinate are added to the electrode paste 22. Since $BaTiO_3$, which is the main ingredient of the dielectric layer 12 (and the green sheet 20), is commonly used in the $BaTiO_3$ powder, adding the $BaTiO_3$ powder to the electrode paste 22 significantly alleviates differences in shrinkage ratio and sintering start temperature between the electrode paste 22 and green sheet 20. On the other hand, the metal resinate is a mixture of Ba resinate and Ti resinate, which are mixed such that the mole number of Ba in Ba resinate is the same as the mole number of Ti in Ti resinate. The electrode paste 22 doped with such a metal resinate generates fine metal particles between particles of a nickel powder which is the main ingredient at the time of firing which will be explained later.

Then, the green sheet 20 coated with the electrode paste 22 explained in, the foregoing is stacked on one of the green sheets 21 such that the electrode paste 22 faces up (see FIG. 3(a)). Also, about 300 green sheets 20 made by the same method are successively stacked such that respective positions of their electrode pastes 22 alternate with each other (see FIG. 3(b)). Then, the other uncoated green sheet 21 is overlaid on the laminated green sheets 20, and thus obtained laminate is pressed in the laminating direction, so that the green sheets 21, green sheets 20, and electrode pastes 22 are pressed against each other. This produces a laminate 26 in which the green sheets 20 and electrode pastes 22 are laminated so as to alternate with each other.

This laminate 26 is cut into rectangular regions 24 corresponding to respective capacitors, so as to form chips (see FIG. 3(c)). Thereafter, each laminate chip 26 is fired under a predetermined temperature condition, whereby the green sheets 21, green sheets 20, and electrode pastes 22 become the above-mentioned surface layers 11, dielectric layers 12, and inner electrode layers 14, respectively. As a result, the laminate 26 becomes the capacitor matrix 16 in which the dielectric layers 12 and inner electrode layers 14 are laminated so as to alternate with each other. Finally, outer electrodes 18 are formed by a known method so as to cover a pair of opposing end faces 16a, 16b extending in the laminating direction among the end faces of the capacitor matrix 16, whereby the ceramic capacitor 10 is completed (see FIG. 3(d)).

Thus produced ceramic capacitor 10 will now be explained.

As mentioned above, the ceramic capacitor 10 is formed by coating the surface 20a of the green sheet 20 with the electrode paste 22 and firing the resulting product. The electrode paste 22 contains a nickel powder as a main ingredient, and additionally includes a $BaTiO_3$ powder and a metal resinate.

Since the $BaTiO_3$ powder having the same composition as with BaTiO3 constituting the dielectric layer 12 (and green sheet 20) is added to the electrode paste 22, the shrinkage ratio of the electrode paste 22 at the time of firing is closer to that of the green sheet 20 than in the case where only the metal resinate is added to the electrode paste 22 without adding the $BaTiO_3$ powder thereto. This significantly restrains the adhesion between the dielectric layer 12 and the inner electrode layer 14 from lowering after the firing. Therefore, the electrostatic capacity of the capacitor 10 is restrained from decreasing as the adhesion between the dielectric layer 12 and the inner electrode layer 14 lowers. Also, the sintering start temperature of the electrode paste 22 is closer to that of the green sheet 20 in the case where the $BaTiO_3$ powder is added to the electrode paste 22 as such than in the case where no $BaTiO_3$ powder is added thereto. This significantly restrains the electrode paste 22 from being fired in excess, thereby keeping the continuity of the inner electrode layer 14 from lowering and the electrostatic capacity of the ceramic capacitor 10 from decreasing. Also, since the electrode paste 22 is doped with Ti resinate and Ba resinate, its sintering start temperature approaches that of the green sheet 20, thereby significantly improving the continuity of the inner electrode layer 14 after the firing. Further, since the Ti resinate and Ba resinate which generate fine particles of Ti and Ba, respectively, at the time of firing are added to the electrode paste 22, functions of the inner electrode layer 14 are significantly kept from deteriorating when a large amount of insulating $BaTiO_3$ powder is added to the electrode paste 22. Namely, adding Ti resinate and Ba resinate to the electrode paste 22 raises the sintering start temperature of the electrode paste 22 while suppressing the amount of addition of the common material ($BaTiO_3$ powder) thereto, thus significantly suppressing the deterioration in functions of the inner electrode layer 14 as compared with the case where only the common material is added to the electrode paste 22 so as to raise the sintering start temperature thereof.

Therefore, firing the laminate 26 in which a plurality of green sheets 20 each coated with the electrode paste 22 are stacked produces the ceramic capacitor 10 having improved the continuity of inner electrode layers 14 while suppressing the decrease in adhesion between the dielectric layers 12 and inner electrode layers 14 and the deterioration in functions of the inner electrode layers.

Since the metal components (i.e., Ti and Ba) of the metal resinate added to the electrode paste 22 are of the same species as those of the metal components of the BaTiO$_3$ powder, fine metal particles of the same species as those of the metal components of the BaTiO$_3$ powder are generated when the electrode paste 22 is fired. In this case, even when Ti and Ba generated from the metal resinate diffuse into the dielectric layers, the species of elements constituting BaTiO$_3$, which is the main ingredient of the dielectric layers, do not change, whereby the diffusion is significantly restrained from affecting the dielectric layers.

When the mixing ratio of Ti resinate and Ba resinate is 1:1 as with the molar ratio of Ti and Ba in BaTiO$_3$, fine particles of Ti and Ba generated at the time of firing effectively yield BaTiO$_3$. Namely, at the time of firing, both fine particles and oxygen contained in the metal resinate combine together, thereby generating BaTiO$_3$ which is the same as the main ingredient of the common material and dielectric layer. Though the generation of insulating BaTiO$_3$ slightly deteriorates functions of the electrode layer, the amount of BaTiO$_3$ inherent in the electrode layer can be suppressed significantly in the case where BaTiO$_3$ is generated from the metal resinate than in the case where the BaTiO$_3$ powder is directly added as a common material to the electrode paste when raising the sintering start temperature of the electrode paste 22 to the same level.

Letting α be the wt % concentration of the metal components in the metal resinate (BaTi resinate) in which Ti resinate and Ba resinate are mixed together with respect to the metal powder Ni contained in the electrode paste 22, and β be the wt % concentration of the BiTiO$_3$ powder with respect to the Ni powder contained in the electrode paste 22, α and β preferably satisfy the following expressions (1) and (2):

$$0 < \alpha \leq 5 \quad (1)$$

$$3 \leq \alpha \leq 15 \quad (2)$$

More preferably, α and β satisfy the following expressions (3) and (4):

$$0.5 < \alpha \leq 2 \quad (3)$$

$$5 \leq \alpha \leq 15 \quad (4)$$

As explained in the foregoing, the present invention provides a ceramic electronic element having improved the continuity of inner electrode layers while suppressing the decrease in adhesion between its dielectric layers and inner electrode layers and the deterioration in functions of the inner electrode layers, and a method of making the same.

Without being restricted to the above-mentioned embodiment, the present invention can be modified in various manners. For example, the ceramic electronic element is not limited to the ceramic capacitor, but may be various electronic elements such as piezoelectric resonator elements and chip resistor elements. The metal resinate is not limited to Ba resinate and Ti resinate, but may be Ca resinate, Sr resinate, Zr resinate, and Hf resinate, for example.

EXAMPLE

Details of the present invention will now be explained specifically with reference to an example.

First, the electrode used in this example will be explained. The electrode paste used in this example is one in which an Ni powder having an average particle size of 0.2 μm, BaTi resinate, a BaTiO$_3$ powder having an average particle size of 0.05 μm, ethyl cellulose, and terpineol are mixed and dispersed together by an alumina ball media mill. Weight ratios of these paste materials are such that BaTi resinate is 1, BaTiO$_3$ is 5, ethyl cellulose is 4, and terpineol is 80 when the Ni powder is 100. Among these ratios, the ratio of BaTi resinate is one calculated as the metal components contained therein.

By screen printing, the above-mentioned electrode paste was applied to a surface of a BaTiO$_3$ type green sheet. Here, the electrode paste was applied by a thickness of about 1.2 μm so that it became 1 μm after firing. The screen pattern was one corresponding to an inner electrode layer. Thus, 300 green sheets each coated with the electrode paste and sufficiently dried were prepared. These green sheets were successively laminated on an uncoated green sheet, and finally were covered with an uncoated green sheet, whereby a laminate was produced. Thus obtained laminate was pressed at a pressure of 1500 kg/cm$^2$ in the laminating direction, and was cut into a predetermined size, so as to yield a chip.

The resulting laminate chip was heated to 400° C. at a rate of 200° C./h in a furnace in an ambient atmosphere, and was held at this temperature for 1 hour. This burned out the organic components of the green sheets and electrode paste. Thereafter, with the atmosphere within the furnace changed to a mixed gas atmosphere of H$_2$ (3 vol %) and N$_2$ (97 vol %), the chip was heated to 1290° C. at a rate of 200° C./h, and then was held at this temperature for 2 hours. Thereafter, the temperature was lowered to 20° C. at a rate of 200° C./h, whereby the firing of the laminate was completed.

A conductive paste constituted by a Cu powder, glass frit, and a vehicle was applied to a pair of opposing, faces where the inner electrode layers were exposed among end faces of thus fired chip, and was dried. After drying, the chip was burned in an N$_2$ atmosphere, and was subjected to Ni plating and Sn plating, so as to form outer electrodes. This produced a sample A of ceramic capacitor.

Also, with weight ratios of BaTi resinate and BaTiO$_3$ (common material) changed in the method mentioned above, samples B and C were obtained. Namely, the weight ratios of BaTi resinate and the common material were 1 and 10, respectively, in sample B, and 3 and 15, respectively, in sample C when the Ni powder was 100.

For comparison, samples D, E, and F were obtained with weight ratios of BaTi resinate and the common material changed. Namely, the weight ratios of BaTi resinate and the common material were 3 and 0, respectively, in sample D, 10 and 0, respectively, in sample E, and 0 and 20, respectively, in sample F when the Ni powder was 100.

For each of samples A to F shown in the foregoing, the sintering start temperature, shrinkage ratio, and electrostatic capacity were determined. These results are shown in Table 1 which will follow. In Table 1, "Ni", "Resinate", and "Common material" indicate respective weight ratios of paste materials in the electrode paste expressed by the unit of wt %. "Sintering start temperature" indicates a temperature at which the electrode paste of each sample starts sintering, whose unit is ° C. "Shrinkage ratio" indicates the shrinkage ratio of each sample at 1200° C., whose unit is %. "Electrostatic capacity" is the electrostatic capacity of each sample, whose unit is nF.

TABLE 1

| | Ni | Resinate | Common material | Sintering Start temperature | Shrinkage ratio | Electrostatic capacity |
|---|---|---|---|---|---|---|
| Sample A | 100 | 1 | 5 | 880 | 15 | 25.6 |
| Sample B | 100 | 1 | 10 | 900 | 13 | 27.4 |
| Sample C | 100 | 3 | 15 | 920 | 13 | 26.2 |
| Sample D | 100 | 3 | 0 | 820 | 18 | 23.9 |
| Sample E | 100 | 10 | 0 | 950 | 30 | 23.5 |
| Sample F | 100 | 0 | 20 | 900 | 13 | 24.7 |

As can be seen from Table 1, each of samples (samples A, B, and C) in which both BaTi resinate and the common material were added to the electrode paste exhibited a high sintering start temperature of 880° C. or higher in the electrode paste, and a high level of electrostatic capacity, i.e., 25 nF or higher.

The invention claimed is:

1. A method of making a ceramic electronic element, the method comprising the steps of:
    applying an electrode paste containing a metal powder and additionally including a ceramic dielectric powder and a metal resinate to a surface of a ceramic article having a sheet form made of the ceramic dielectric powder;
    stacking a plurality of ceramic articles each coated with the electrode paste so as to form a laminate comprising the ceramic articles and electrode pastes stacked alternately with each other; and
    firing the laminate,
    wherein the metal resinate comprises a metal component of the same species as that of a metal component acting as a main ingredient of the ceramic dielectric.

2. A method of making a ceramic electronic element, the method comprising the steps of:
    applying an electrode paste containing a metal powder and additionally including a ceramic dielectric powder and a metal resinate to a surface of a ceramic article having a sheet form made of the ceramic dielectric powder;
    stacking a plurality of ceramic articles each coated with the electrode paste so as to form a laminate comprising the ceramic articles and electrode pastes stacked alternately with each other; and
    firing the laminate,
    wherein the electrode paste contains a plurality of species of mixed metal resinates comprising respective metal components corresponding to a plurality of metal components of the ceramic dielectric, whereas the plurality of species of mixed metal resinates have such a mixing ratio that the metal components contained in the resinates have respective molar ratios substantially identical to those of the metal components of the ceramic dielectric.

3. A method of making a ceramic electronic element according to claim 2, wherein the ceramic dielectric is mainly composed of $BaTiO_3$, and wherein the plurality of species of mixed metal resinates are constituted by Ti resinate and Ba resinate mixed such that Ti and Ba have substantially the same mole number.

4. A method of making a ceramic electronic element, the method comprising the steps of:
    applying an electrode paste containing a metal powder and additionally including a ceramic dielectric powder and a metal resinate to a surface of a ceramic article having a sheet form made of the ceramic dielectric powder;
    stacking a plurality of ceramic articles each coated with the electrode paste so as to form a laminate comprising the ceramic articles and electrode pastes stacked alternately with each other; and
    firing the laminate,
    wherein the metal resinate contains at least one of Ba resinate, Ca resinate, Sr resinate, Ti resinate, Zr resinate, and Hf resinate.

5. A method of making a ceramic electronic element, the method comprising the steps of:
    applying an electrode paste containing a metal powder and additionally including a ceramic dielectric powder and a metal resinate to a surface of a ceramic article having a sheet form made of the ceramic dielectric powder;
    stacking a plurality of ceramic articles each coated with the electrode paste so as to form a laminate comprising the ceramic articles and electrode pastes stacked alternately with each other; and
    firing the laminate,
    wherein, letting $\alpha$ be the wt % concentration of the metal component in the metal resinate with respect to the metal powder contained in the electrode paste, and
    $\beta$ be the wt % concentration of the ceramic dielectric powder with respect to the metal powder contained in the electrode paste,
    $\alpha$ and $\beta$ satisfy the following expressions (1) and (2):

$$0 < \alpha \leq 5 \quad (1)$$

$$3 \leq \alpha \leq 15 \quad (2).$$

6. A method of making a ceramic electronic element according to claim 5, wherein $\alpha$ and $\beta$ satisfy the following expressions (3) and (4):

$$0.5 < \alpha \leq 2 \quad (3)$$

$$5 \leq \alpha \leq 15 \quad (4).$$

* * * * *